March 12, 1968   D. F. O'BRIEN   3,373,330
POWER REGULATOR
Filed Oct. 15, 1964   2 Sheets-Sheet 1

INVENTOR.
DONALD F. O'BRIEN
BY
ATTORNEYS

March 12, 1968    D. F. O'BRIEN    3,373,330
POWER REGULATOR
Filed Oct. 15, 1964    2 Sheets-Sheet 2

DONALD F. O'BRIEN
INVENTOR.

BY
ATTORNEYS

United States Patent Office 3,373,330
Patented Mar. 12, 1968

3,373,330
POWER REGULATOR
Donald F. O'Brien, 55 Fairview Ave.,
Watertown, Mass. 02172
Filed Oct. 15, 1964, Ser. No. 404,110
19 claims (Cl. 318—308)

ABSTRACT OF THE DISCLOSURE

An alternating current-to-alternating current power regulator for an alternating current consuming load having a wide range of impedance variations wherein the power components supplied to or extracted from the load are sampled and applied as inputs to a combiner such as a Hall effect device. The output of the combiner is utilized to control the conduction angle of the alternating current power input for the load.

This invention relates to electric power regulators and more particularly to an alternating current power regulating device wherein the average alternating current power delivered to a varying load impedance is maintained constant over a wide range of load impedance variation.

It is apparent that one of many fields that may utilize a constant power regulator is the motor control art. In motor control, the development of constant power (horsepower at the output shaft) is one means that offers tremendous possibilities for speed control, torque control, high efficiency utilization and etc. Some of the other applications of constant power regulators appear for example, in arts involving heating elements, gyroscopes, motor starting, in addition to speed control, torque control.

If one considers a perfect motor, as it is driven by a constant power source, it becomes apparent from the fundamental expression $P = t\theta$ where $P$ = the output power; $t$ = torque and $\theta$ = the angular velocity. If one were to now plot a curve of torque vs. speed, the curve would be a hyperbola wherein the torque is plotted along the axis of ordinates and the angular velocity or speed is plotted along the axis of abscissas.

If one is now able to electronically control either the torque or the speed of the motor, the varying element (speed or torque) may be caused to move over wider ranges along the hyperbola than is possible with any combination of gear ratios.

A 1:1 gear ratio will provide torque control over a fairly large range but will only provide the control over a relatively narrow range of speeds. Similarly, a 10:1 gear ratio will produce a relatively broad speed control range but will only provide a narrow range of torques. Hence, torque control (regulation) is greater in an electronic device utilizing the hyperbolic curve of constant power than that accomplished by a geared device, with a concomitant decrease in power loss by virtue of gear elimination.

The foregoing exposition is predicated on the existence of a perfect motor and it is a well known fact that the perfect motor does not exist.

One prior art attempt at a universal motor adjustable speed drive appears in the General Electric Silicon Controlled Rectifier Manual (Second edition), 1961, on pages 125 and 126 where a circuit is suggested for electronically maintaining speed control for a motor. However, this device makes use of the motor residual field to induce a counter EMF in the armature that is is proportional to speed. This circuit appears to have the disadvantage of having to be tailored to each motor because each armature will have a different residual field and therefore the counter EMF will have to be different from motor to motor.

Other prior art attempts at motor control utilize such elements as saturable reactors, and step switching rheostats. In general, however, the prior electro-mechanical techniques present the choice of either large (bulky), expensive but nonetheless slow responding elements to achieve smooth (continuous) control over a limited range of impedance variations or elements that operate in discrete steps and coincidentally induce large power transients.

I have provided a device which includes the motor within a closed loop and measures the output mechanical power of the motor and by utilizing this measured quantity as the controlling mechanism for a pair of silicon controlled rectifiers which supply the load (i.e., the power delivered to the load).

Operationally, the average power supplied to the load is dependent upon the conduction angle or conducting time of the silicon controlled rectifiers (SCR). In my device the conduction angle is controlled by a null seeking, negative feedback circuit in which an error signal is derived from the combination of a reference voltage and a continuous measurement of average power applied and then utilizing the error signal to control the conduction of a multivibrator or gate circuit which in turn, determines the conduction angle of the SCR's.

While SCR's are described in the foregoing discussion, it will be obvious that any other element having similar properties may be used as the controlling device and these other devices include, but are not necessarily limited to, thyratron mercury vapor tubes and etc.

It is therefore a principal object of the present invention to provide a closed loop alternating current average power control.

Another principal object of the present invention is to provide a closed loop alternating current average power control capable of being utilized to control the torque and angular velocity of the motor.

Still another principal object of the present invention is to provide a closed loop alternating current average power control capable of being utilized to control the torque and angular velocity of a motor by using a Hall effect device as a combiner.

A further principal object of the present invention is to provide a closed loop alternating current average power control capable of being utilized to control the torque and angular velocity of a motor in a smooth continuous manner to thereby avoid inducing large transients and eliminate the need for any gear train.

My device utilizes a combiner (in practice a Hall effect device or similar multiplier) having the applied load power as its input. An integrator accepts the combiner output and in turn produces an output therefrom that is proportional to the average power applied to the load. A comparator or summing point then accepts both the output of the integrator and the output of a reference signal which reference signal is proportional to the desired average power. The comparator output then represents an error signal that is proportional to any discrepancy between the average power being delivered and the desired average power. It is the error signal that is applied to a gate circuit which determines the balance (ratio) of "On" time to "Off" time. The basic synchronization for the gate circuit is supplied by the line voltage and its output is fed to a control electrode which determines the conduction angle of the silicon controlled rectifiers.

The features of my invention which I believe to be novel are set forth with particularity in the appended claims. My invention itself, however, both as to its organization and method of operation, together with further objects and advantages thereof, may best be understood by reference to the following description taken in conjunction with the accompanying drawings, in which:

FIG. 4 is a block diagram utilizing the basic principles of FIGS. 1 and 2, as applied to a speed-torque control device.

Figure 1:
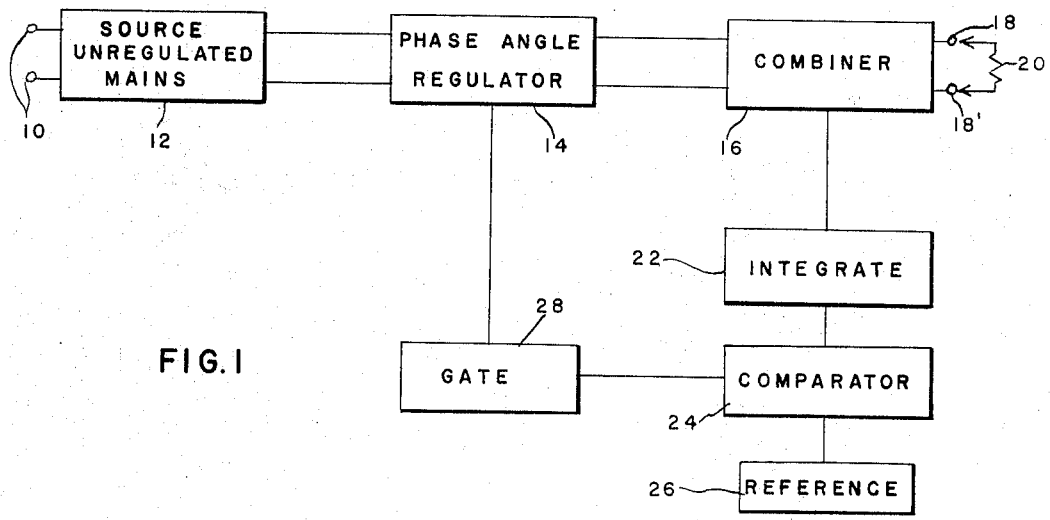
FIG. 1 is a block diagram embodying the basic principles of my invention.

Referring now to FIG. 1 for the basic block diagram of one embodiment of my invention, there is shown a pair of terminals 10 to which a source of power may be connected. The terminals 10 provide the input for the source of unregulated mains 12 the output of which in turn provides the input to the phase angle regulator 14. The output of the phase angle regulator 14 is applied as an input to the combiner 16 having as one output thereof terminals 18 and 18' to which a load 20 is connected. The other output of combiner 16 is the input to a feedback loop between combiner 16 and phase angle regulator 14 and consists of integrator 22, comparator 24 and gate 28 in series between combiner 16 and phase angle regulator 14. A source of reference potential 26 is connected as an input to comparator 24, the operation of which will be described hereinafter.

Figure 2:
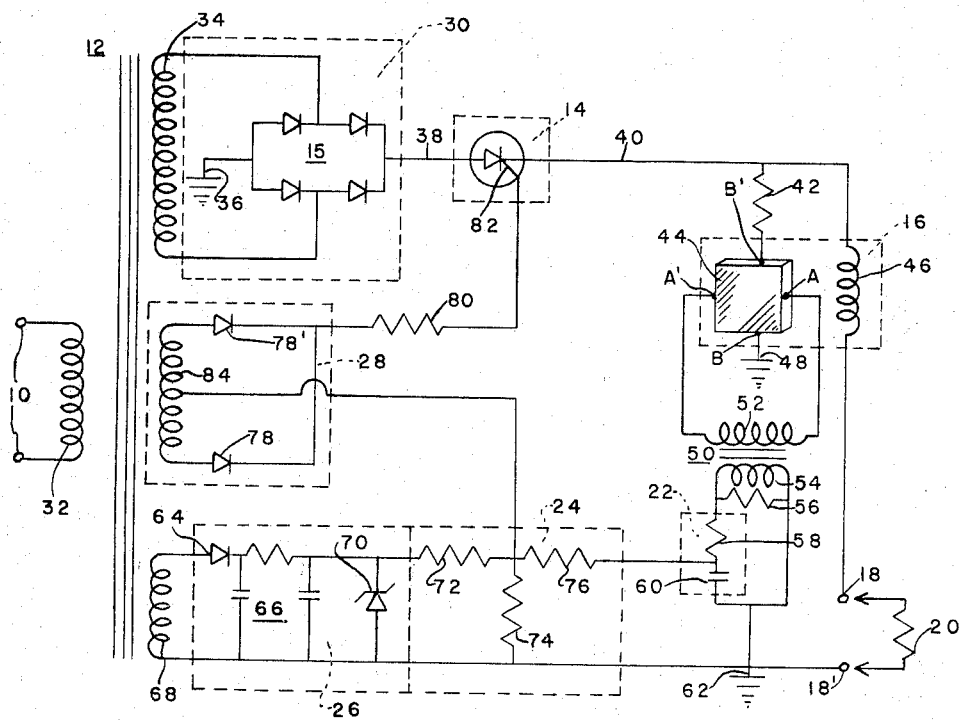
FIG. 2 is an operative embodiment utilizing the principles of the block diagram of FIG. 1.

Referring now to FIG. 2 there is shown in detail, one operational embodiment of the block diagram of FIG. 1 wherein terminals 10 are provided so that a source of power (not shown) may be applied to primary winding 32 of transformer 12 which transformer constitutes the source of unregulated mains. The ends of secondary winding 34 are connected to opposite corners of rectifying circuit 30 shown here with four diodes 15 arranged in a bridge configuration wherein one corner is connected to ground 36 and the opposite corner is connected to lead 38. Lead 38 is applied to the anode of the phase angle regulator silicon controlled rectifier 14. The cathode is connected to lead 40 and the gating or control electrode is connected to lead 82. It should be understood, that the signal appearing on lead 38 will be twice the frequency of the signal applied to terminals 10 and, the signal will be a pulsating DC.

As will be hereinafter used, the word "combiner" denotes any device which simultaneously samples both the current and the voltage instantaneously applied to the load and which has an electrical output that is proportional to the product of the instantaneous current and voltage applied to the load. Thus, in this context, it will be seen that while this definition is satisfied by a Hall effect device, any other analog multiplier will suffice such as a Willby multiplier, a Quarter Square multiplier, or a multiplier operating on the first or second reflex Weideman effect or etc.

While the foregoing description will be slanted in terms of a Hall effect device, it will be obvious to those skilled in the art that my invention may be suitably modified to accommodate other applicable combiners.

Lead 40, connected to the cathode of SCR 14, also provides the output lead for load 20 and, has coil 46 in series between terminal 18 and the cathode of SCR 14. Terminal means 18' is connected to ground to complete the circuit back to ground connection 36. The passage of current (drawn by load 20) through coil 46 induces a magnetic field in coil 46 which acts upon the Hall effect plate 44. Resistor 42 is connected at one end to lead 40 and at its other end to terminal B' on one edge of the Hall effect plate 44. Terminal B, situated on the opposite edge of the Hall effect plate 44 is connected to ground 48.

Since this invention will, for purposes of illustration, be described in terms of a Hall effect device combiner, it is expedient at this point to describe the operation of a Hall effect device.

A Hall effect device comprises a Hall plate, typically made of indium arsenide or gallium arsenide and which exhibits the Hall effect: that is, when cut by a field flux through its thin dimension and threaded by a current flowing between two opposite edges, a voltage appears across the conjugate edges. This voltage, at any instant, will be proportional to the product of the field flux and the input voltage, with the field flux being proportional to the current generating the field flux. In this instance, since both the flux and the input currents are both pulsating direct current, the output voltage will also be a pulsating direct current voltage. Characteristically, the Hall plate is positioned in the air gap of an electromagnet having an energizing coil which produces a field flux. In this instance, coil 46 is the energizing coil which produces the field flux.

The output voltage of the Hall plate 44 is taken off at terminals A-A' and is applied as an input to primary winding 52 of transformer 50. Secondary winding 54 has a shunt load resistor 56 connected thereacross and, in parallel with resistor 56 is integrator 22, the parameters of which are chosen so as to produce a signal proportional to the average power applied to load 20. One side of the secondary winding 54 is shown connected to ground 62 and represents one output terminal, in which case the other output terminal is taken from the common connection of the series resistor 58-capacitor 60 combination which forms the integrator network 22. The output of integrator 22 is applied as one input to comparator 24 which consists of resistors 72, 74 and 76 connected in a T configuration.

A reference potential 26 is applied as the other input to the comparator 24 and consists of another secondary winding 68 having rectifier 64 connected to one end of the winding in a half wave configuration, with the other end of the winding being connected to ground 62. The output of rectifier 64 is applied to a filter network 66 arranged in a π configuration having a zener diode 70 connected across the output of the filter 66 to provide a constant reference voltage for comparator 24. The output of comparator 24 (which now represents an error signal) is taken from the common junction of resistors 72, 74 and 76 and is applied to the center tap of the secondary winding 84 which represents the gate circuit 28 which consists of a pair of rectifiers 78 and 78' connected in a full wave, center tap configuration across the ends of winding 84. The anodes of diode 78 and 78' are connected directly to the ends of secondary winding 84 while the cathodes of diodes 78 and 78' are connected together and to one end of a limiting resistor 80 the other end of which is connected to the control element 82 of SCR 14 to control the firing angle thereof.

Thus, as the power applied to the load (as represented by resistor 20) varies, the varying current being drawn by the load will vary the intensity of the magnetic field created by coil 46. Similarly, since the Hall plate 44, in series between resistor 42 and ground, is in parallel with the terminals 18 and 18', any variations in voltage requirements applied to the terminals, due to a change in power to the load will also appear across the Hall plate. This then satisfies all the necessary input requirements for the Hall device and since the reference voltage (26) applied to the comparator is maintained constant, any variation about the fixed reference voltage level will be manifested in a change of voltage applied to control electrode 82 to change the firing angle of SCR 14 thereby compensating for power variations appearing at terminals 18 and 18' due to load 20.

Since the wave shape appearing on lead 40 is a pulsating DC the output at terminals 18, 18' is a pulsating DC, which can readily be converted to AC if AC is required by load 20. This pulsating DC nevertheless creates a rising and falling magnetic field in coil 46 in synchronism or phase with the voltage appearing across the series combination of resistor 42, Hall plate 44 and ground 48 producing an AC output from terminals A–A'. Since it is necessary to know only the average AC power applied to the load 20, the pulsating or AC signal appearing across the conjugate point A–A' of the Hall plate 44 the AC is integrated by means of integrator 22 and it is this integrated signal that is applied as an input to the comparator 24. Therefore, in this particular situation, I am principally interested in detecting the changes in the average value of the alternating current power applied to the load and I am not interested in the instantaneous changes as one would be, when dealing with direct current.

Figure 3A:
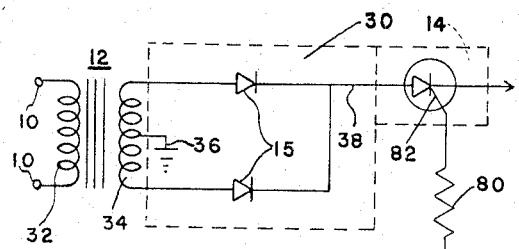
FIGS. 3 and 4 represent variations in the rectifier system of FIGS. 1 and 2.

While FIG. 2 has been described in terms of a full wave bridge rectifier configuration, it will be obvious to those skilled in the art that other rectifier configurations are possible. Reference is now made to FIG. 3A which shows a full wave, center tap rectifier configuration wherein primary winding 32 of transformer 12 is connected to terminals 10. The secondary winding 34 has its center tap connected to ground 36 while the outer ends of the winding 34 are connected to the anodes of rectifiers 15. The cathodes of rectifiers 15 are connected together and to one end of lead 38, the other end being connected to the anode of SCR 14. The cathode of SCR 14 is connected to lead 40 while the control electrode 82 is connected to resistor 80.

Figure 3B:
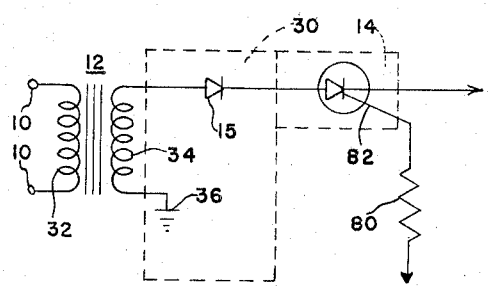

Still another rectifier embodiment is shown in FIG. 3B which is a half wave configuration. In this embodiment, primary winding 32 of transformer 12 is connected to input terminals 10 while secondary winding 34 has one end connected to ground 36 and its other end connected to the anode of diode 15. The cathode of diode 15 is connected by means of lead 38 to the anode of SCR 14 while the cathode is connected to lead 40. The control electrode 82, in a similar manner, is connected to resistor 80. In all other respects FIGS. 3A and 3B are directly interchangeable with elements 30 and 14 of FIG. 2.

Figure 4:
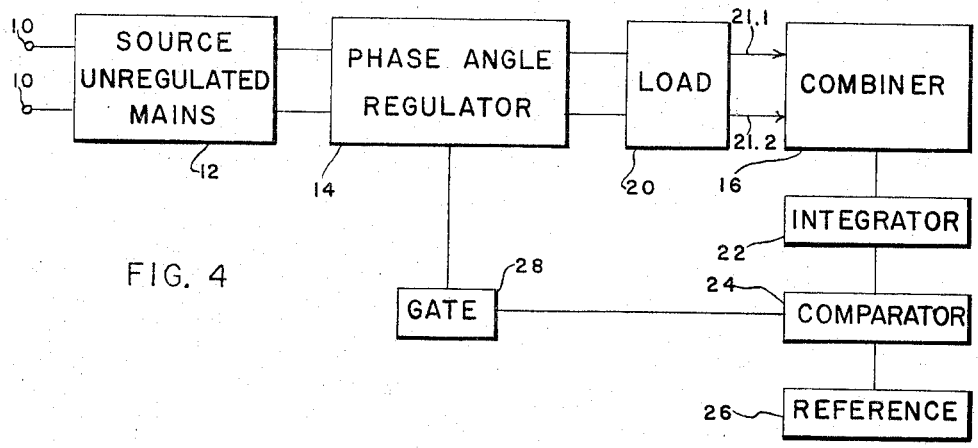

Referring now to FIG. 4 for the basic block diagram of another embodiment of my invention, there is shown a pair of terminals 10 to which a source of power may be connected. Terminals 10 provide the input for the source of unregulated mains 12 the output of which in turn provides the input to the phase angle regulator 14. The output of the phase angle regulator 14 is then applied as an input to load 20. The output of load 20 (which may be the speed and torque of a motor shaft) is detected and the detected output in the form of torque information and speed information is applied by means of leads 21.2 and 21.1 respectively as inputs to the combiner 16. This combiner 16 operates in a similar manner to that previously described with regard to FIG. 2. While element 20 is called a load it should be understood that this may be a transducer for converting, for example, electrical energy to mechanical energy. However, in this particular system, the input to the transducer represents the load insofar as phase angle regulator 14 is concerned.

The output of combiner 16 represents a feed-back loop extending between combiner 16 and phase angle regulator 14 and consists of integrator 22, comparator 24 and gate 28 in series between combiner 16 and phase angle regulator 14. As in the previous embodiments, a source of reference potential 26 is connected as an input to comparator 24 the operation of which has been described.

Figure 5:
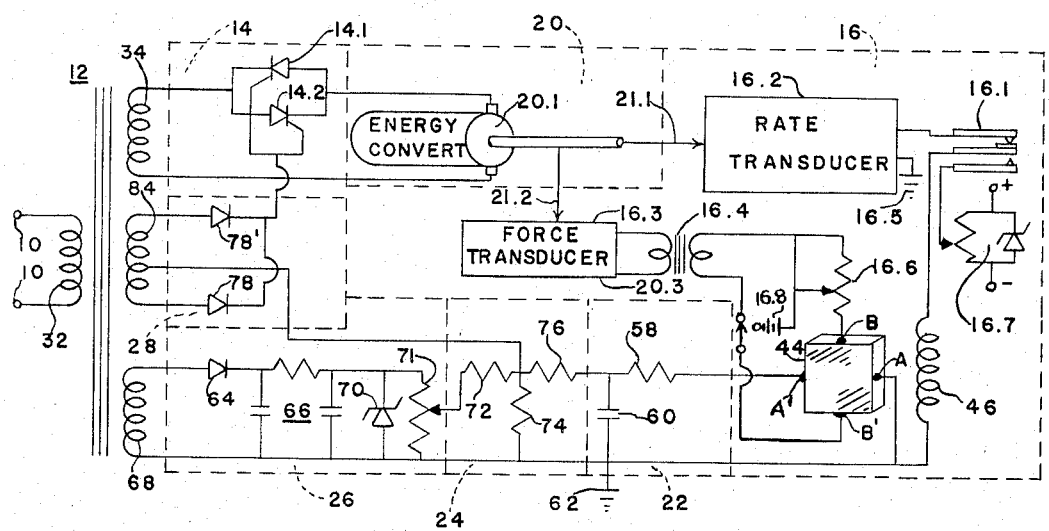
FIG. 5 is an operative embodiment of the principles set forth in the block diagram of FIG. 4.

Referring now to FIG. 5, there is shown in detail, the embodiment of the block diagram of FIG. 4 wherein a pair of terminals 10 are provided so that a source of power (not shown) may be applied to primary winding 32 of transformer 12. Transformer 12 constitutes the source of unregulated means. One end of secondary winding 34 is connected to a pair of back-to-back silicon controlled rectifiers (SCR's) 14.1 and 14.2 which together, constitute the phase angle regulator 14. The output of the phase angle regulator 14 (SCR's 14.1 and 14.2) is applied to one end or one side of energy converter 20.1 which represents the load 20. To complete the circuit, the other side of the energy converter is connected to the other side of the secondary winding 34 of transformer 12.

As used in this context, the expression "energy converter" describes a device that is driven by electrical power applied at its input and having at its output two components, namely rate (speed) and force. Particularly in the case of a motor, the rate (speed) is represented by the rotation of the motor shaft and the force is represented by the torque delivered by the shaft.

As will hereinafter be used, the expression "rate transducer" will be used to denote a device having a mechanical input (as represented by the rate of rotation in the case of the motor) and an electrical output. One of the parameters of the electrical output (either the magnitude or the frequency of the electrical output) is proportional to the rate of rotation delivered at the input to the "rate transducer."

As will be hereinafter used, the expression "force transducer" will be used to denote a device having a mechanical input (as represented by the force or the torque delivered by the shaft in the case of a motor) and an electrical output, one of the parameters of which (either the magnitude or the frequency of the electrical output) being proportional to the force or the torque delivered at the input thereof.

The rate or speed information 21.1 is applied as a mechanical input to the rate transducer 16.2. Similarly, the force or torque information 21.2, is applied as the other mechanical input to force transducer 16.3. Both inputs representing the necessary inputs to the combiner 16 (FIGS. 1 and 4).

The application of rate or speed information 21.1 to rate transducer 16.2 produces at the output thereof electrical energy that is proportional to the rate or speed information applied at the input. The electrical rate signal output of rate transducer 16.2 is applied to one end of coil 46, through the series relay contact 16.1, the other end of the coil being connected to ground 62. The passage of current through coil 46 induces a magnetic field therein (as has been described) to act upon the Hall plate 44 and satisfy one requirement for the operation thereof.

The application of force or torque information 21.2 as an input to force transducer 16.3 produces at the output thereof electrical energy that is proportional to the mechanical energy applied at the input. This electrical force signal (while it is shown here as being A.C., it should be obvious that it might, under certain circumstances be desirable to have D.C. as its output) is applied to the primary winding of transformer 16.4. The secondary winding of the transformer has a variable resistor 16.6 connected in series with the winding and the Hall plate 44 so that the voltage applied to edge B–B' of Hall plate 44 may be varied and suitably chosen.

Edge A of Hall plate 44 (one output terminal) is connected to ground 62 while edge A' (the other output terminal) is applied as an input to integrator 22 which consists of series resistor 58 and shunt capacitor 60. As previously stated, it is necessary that the Hall plate 44 be cut by the field flux generated by coil 46 through its thin dimension and threaded by a current flowing between edges B–B' with the field flux being proportional to the current generated by the rate transducer (and therefore proportional to the rate or rotation of converter 20.1) and the voltage at any instant, being proportional to the voltage—impressed across the edges B–B' (and therefore proportional to the torque of converter 20.1). In this particular showing, since either or both the rate and torque information are bidirectional, that is, alternating current, the output voltage will also be an alternating current voltage although as will be seen hereinafter, D.C. may be desirable at either or both output.

A reference potential derived from stage 26 is applied as the other input to the comparator 24. Stage 26 consists of another secondary winding 68 having rectifier 64 connected to one end of the winding in a half wave configuration, the other end of the winding being connected to ground 62 to complete the circuit. The output of rectifier 64 is applied to a filter network 66 connected in a π configuration having a zener diode 70 connected across the output of filter 66 to provide a constant reference voltage for comparator 24. However, in order to provide an adjustment means, variable shunt resistor 71 is interposed between the zener diode 70 and the resistor 72.

The output of comparator 24 is taken from the common junction of resistors 72, 74 and 76 and is applied to the center tap of the secondary winding 84. A pair of rectifiers 78 and 78' (representing gate circuit 28) are connected in a full wave center tap configuration across the ends of winding 84. The anodes of diodes 78 and 78' are connected to the ends of secondary winding 84 while the cathodes of diodes 78 and 78' are connected together and to both control electrodes of silicon controlled rectifiers 14.1 and 14.2 to thus complete the feed-back loop.

It should be noted that there is a single pole double throw switch 16.1 in the output lead of rate transducer 16.2. This switch, in conjunction with the zener diode-resistor combination 16.7 provides a means for maintaining constant force at the shaft of energy converter 20.1. In the position shown, switch 16.1 allows rate transducer 16.2 and force transducer 16.3 to provide the necessary individual inputs to the Hall effect device 44. However, if it is desired to provide an energy converter 20.1 having a constant speed irrespective of any variation in the torque, then switch 16.1 is moved so that it contacts the lower switch element and a constant, steady state current is passed through coil 46 by means of constant current source 16.7. This constant current will maintain speed information applied to coil 46 at an unvarying constant level and any variations in the force can be corrected by correcting any variations appearing in the output signal from comparator 24. Similarly, should there be a need to have a device which will provide a constant torque, irrespective of variations in speed, it is merely necessary to switch in a constant DC voltage 16.8 across points B–B'. This constant current will maintain the torque information applied to Hall plate 44 at an unvarying constant value and any variations in the speed can be corrected by correcting any variations appearing in the output signal from comparator 24.

The preceding has also discussed the problem in terms of a single phase or two wire system but it should now be apparent to those skilled in the art that the system may be utilized to control the average power delivered in a three phase system. If the load is connected in V then the controlling device described would be used in each of the three lines. If the load is connected in Δ then the controlling device would be connected "between legs" and transformers would be used to decouple and isolate the circuitry from the load.

While I have described what is presently considered the preferred embodiments of my invention, it will be obvious to those skilled in the art that various other changes and modifications may be made therein without departing from the inventive concept, and, it is aimed in the appended claims to cover all such changes and modifications as fall within the true spirit and scope of my invention.

What is claimed is:

1. An alternating current power regulating device comprising:
   a source of unregulated alternating current input power;
   means rectifying the unregulated input power to derive an unregulated source of pulsating power comprised of first and second power components;
   load means;
   regulator means connected in series between the rectifying means and the load means for varying the conduction angle of the average power applied to the load means;
   combiner means having a pair of inputs and an output;
   first means sampling the first power component applied to the load means and for applying the sampled first component as one input to the combiner means;
   second means sampling the second power component applied to the load means and for applying the sampled second component to the other input of the combiner means; and
   a feedback loop comprising the combiner means connected between the load and the regulator means to vary the conduction angle of the power applied to the load means in accordance with the sampled power.

2. The device of claim 1 wherein the regulator means is a silicon controlled rectifier.

3. The device of claim 2 wherein the combiner means is a Hall effect device the output signal thereof being proportional to the power components sampled and applied at its input.

4. The device of claim 3 wherein the feedback loop further comprises:
   means integrating the output signal of the combiner means to determine the average power applied to the load;
   reference signal means;
   comparator means for comparing the integrated combiner means output signal with the reference signal means to derive an error signal the magnitude and sense of which represents the difference between the integrated output signal and the reference signal means;
   gating means having an input and an output;
   means applying the error signal to the gating means input; and
   means applying the gating means output to the silicon control rectifier to vary the conduction angle thereof.

5. The device of claim 4 wherein the rectifying means is a full wave rectifier.

6. The device of claim 4 wherein the rectifying means is a half-wave rectifier.

7. An alternating current power regulating device comprising:
   a source of unregulated alternating current input power;
   an energy converter providing a plurality of output components in response to the power applied at its input;
   power regulator means connected in series between the energy converter and the source of power;
   combiner means having a plurality of inputs and an output signal proportional to the product of the inputs;
   means applying each of the plurality of energy converter output components to the combiner as the inputs thereto; and
   a feedback loop comprising the combiner means connected between the energy converter and the regulator means to regulate the power applied to the energy converter in accordance with the combiner means output signal.

8. The device of claim 7 wherein the power regulator means varies the conduction angle of the average power applied to the energy converter.

9. The device of claim 8 wherein the power regulator means is a pair of oppositely poled silicon controlled rectifiers connected in parallel.

10. The device of claim 8 wherein the combiner means is a Hall effect device.

11. The device of claim 8 wherein the feedback loop further comprises:
    means integrating the output signal of the combiner means;
    reference signal means;
    comparator means for comparing the integrated combiner means output signal with the reference signal means to derive an error signal, the magnitude and sense of which represents the difference between the output signal and the reference signal means;

gating means having an input and an output;
means applying the error signal to the gating means input; and
means applying the gating output to the silicon controlled rectifier to vary the conduction angle thereof.

12. An alternating current power regulating device comprising:
   a source of unregulated alternating current input power;
   an energy converter providing a rate component and a force component at its output in response to the power applied at its input;
   power regulator means connected in series between the energy converter and the source of power;
   combiner means having a pair of inputs and an output signal proportional to the product of the inputs;
   means applying the rate component to the combiner as one input thereto;
   means applying the force component to the combiner as the other input thereto; and
   a feedback loop comprising the combiner means connected between the energy converter and the regulator means to regulate the power applied to the energy converter in accordance with combiner means output signal.

13. The device of claim 12 wherein the power regulator means varies the conduction angle of the power applied to the energy converter.

14. The device of claim 13 wherein the power regulator means is a pair of oppositely poled silicon controlled rectifiers connected in parallel.

15. The device of claim 13 wherein the combiner means is a Hall effect device.

16. The device of claim 13 wherein the feedback loop further comprises:
   means integrating the output signal of the combiner means;
   reference signal means;
   comparator means for comparing the integrated combiner means output signal with the reference signal means to derive an error signal, the magnitude and sense of which represents the difference between the output signal and the reference signal means;
   gating means having an input and an output;
   means applying the error signal to the gating means input; and
   means applying the gating means output to the silicon controlled rectifier to vary the conduction angle thereof.

17. An alternating current power regulating device comprising:
   a source of unregulated alternating current input power;
   an energy converter providing mechanical energy at its output consisting of a rate component and a force component, in response to the power applied at its input;
   power regulator means consisting of a pair of oppositely poled parallel connected silicon controlled rectifiers in series between the energy converter and the source of power;
   a Hall effect device having a pair of inputs and an output signal proportional to the product of the pair of inputs;
   first transducer means connected between the output of the energy converter and one combiner means input for converting the rate component to a first electrical information signal proportional to the rate component;
   second transducer means connected between the output of the energy converter and the other combiner means input for converting the force component to a second electrical information signal proportional to the force component; and
   a feedback loop comprising both transducers and the Hall effect device, connected between the energy converter and the power regulator means, to vary the conduction angle of the power applied to the energy converter in accordance with the combiner means output signal.

18. The device of claim 17 wherein the feedback loop further comprises:
   means integrating the output signal of the combiner means;
   reference signal means;
   comparator means for comparing the integrated combiner means output signal with the reference signal means to derive an error signal, the magnitude and sense of which represents the difference between the output signal and the reference signal means;
   gating means having an input and an output;
   means applying the error signal to the gating means input; and
   means applying the gating means output to the silicon controlled rectifier to vary the conduction angle thereof.

19. The device of claim 18 further comprising:
   means converting only one of the components to its respective electrical information signal and applying it as one input to the Hall effect device;
   means providing the other Hall effect device input with a steady signal corresponding to a prescribed component information signal whereby the unconverted component is maintained constant and variations in the converted component is controlled in accordance with the combiner means output signal.

References Cited

UNITED STATES PATENTS 3,086,156  4/1963  Geissing _____ 318—308
3,176,215  3/1965  Kusko _____ 323—94 X

OTHER REFERENCES

Wetzger, German application No. 1,068,342, Nov. 5, 1959, 318–308 (2 sheets. dwg. 2 pp. spec.).

ORIS L. RADER, *Primary Examiner.*

J. BAKER, *Assistant Examiner.*